US012745258B2

(12) United States Patent
Li

(10) Patent No.: US 12,745,258 B2
(45) Date of Patent: Sep. 22, 2026

(54) METHOD AND APPARATUS FOR DETERMINING POSITION OF CONTROL CHANNEL ELEMENT, AND STORAGE MEDIUM

(71) Applicant: Beijing Xiaomi Mobile Software Co., Ltd., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 638 days.

(21) Appl. No.: 18/031,953

(22) PCT Filed: Oct. 15, 2020

(86) PCT No.: PCT/CN2020/121290

§ 371 (c)(1),
(2) Date: Apr. 14, 2023

(87) PCT Pub. No.: WO2022/077383

PCT Pub. Date: Apr. 21, 2022

(65) Prior Publication Data

US 2023/0389042 A1 Nov. 30, 2023

(51) Int. Cl.

*H04W 72/23* (2023.01)
*H04W 16/14* (2009.01)
*H04W 72/232* (2023.01)

(52) U.S. Cl.

CPC ......... *H04W 72/232* (2023.01); *H04W 16/14* (2013.01)

(58) Field of Classification Search

CPC ........ H04W 72/232; H04W 16/14; H04L 5/00
See application file for complete search history.

(56) References Cited

U.S. PATENT DOCUMENTS

| | | | | |
|---|---|---|---|---|
| 2018/0227102 | A1* | 8/2018 | John Wilson | H04L 5/001 |
| 2019/0097756 | A1* | 3/2019 | Chatterjee | H04L 1/0057 |
| 2020/0221363 | A1* | 7/2020 | Lee | H04W 68/00 |
| 2020/0351672 | A1* | 11/2020 | Wigren | H04B 7/0695 |
| 2021/0136823 | A1* | 5/2021 | Kim | H04W 52/36 |
| 2021/0352633 | A1* | 11/2021 | Tiirola | H04L 5/0053 |

(Continued)

FOREIGN PATENT DOCUMENTS

| | | |
|---|---|---|
| CN | 102547738 A | 7/2012 |
| CN | 110351002 A | 10/2019 |

(Continued)

OTHER PUBLICATIONS

ZTE, Sanechips,"NR PDCCH search space and number of BDs/CCEs per slot",3GPP TSG RAN WG1 Meeting #91,R1-1719669,Reno, USA, Nov. 27-Dec. 1, 2017.

(Continued)

*Primary Examiner* — Andrew Lee
(74) *Attorney, Agent, or Firm* — Volpe Koenig

(57) ABSTRACT

A method for determining a position of a control channel element, includes: determining configuration information of at least one target search space set; and determining, according to the configuration information of the at least one target search space set and a hash function, a set of positions for PDCCH candidate CCE of the at least one target search space set, the configuration information comprises group identifier information of the at least one target search space set.

14 Claims, 3 Drawing Sheets

(56) References Cited

U.S. PATENT DOCUMENTS

| | | | | |
|---|---|---|---|---|
| 2021/0409983 | A1* | 12/2021 | Taherzadeh Boroujeni | H04W 72/0446 |
| 2022/0086894 | A1* | 3/2022 | Papasakellariou | H04L 5/0053 |
| 2022/0103227 | A1* | 3/2022 | Lee | H04W 72/23 |
| 2022/0271817 | A1* | 8/2022 | Lee | H04B 17/318 |
| 2023/0080720 | A1* | 3/2023 | Yoon | H04W 72/23 370/329 |
| 2023/0085896 | A1* | 3/2023 | Takeda | H04L 5/0044 |
| 2023/0300881 | A1* | 9/2023 | Myung | H04L 5/00 370/329 |

FOREIGN PATENT DOCUMENTS

| | | | |
|---|---|---|---|
| CN | 110830198 | A | 2/2020 |
| CN | 111181686 | A | 5/2020 |
| CN | 111434162 | A | 7/2020 |
| CN | 111713157 | A | 9/2020 |
| WO | 2018126777 | A1 | 7/2018 |
| WO | 2018128439 | A1 | 7/2018 |
| WO | 2019099876 | A1 | 5/2019 |
| WO | 2019161068 | A1 | 8/2019 |
| WO | 2020033647 | A1 | 2/2020 |
| WO | 2020200177 | A1 | 10/2020 |

OTHER PUBLICATIONS

ZTE, Sanechips,"NR PDCCH search space and number of BDs/CCEs per slot" 3GPP TSG RAN WG1 Meeting #91,R1-1721054, Reno, USA, Nov. 27-Dec. 1, 2017.

ASUSTeK, "Correction on physical downlink control channel", 3GPP TSG RAN WG1 #96bis,R1-1905116,Xian, China, Apr. 8-Apr. 12, 2019.

Intel Corporation, "PDCCH CORESETs and search spaces in NR", 3GPP TSG RAN WG1 #91,R1-1720082,Reno, USA, Nov. 27-Dec. 1, 2017.

Qualcomm Incorporated, "Remaining issues on control resource set and search space", 3GPP TSG RAN WG1 Meeting #92bis,R1-1804798,Sanya, China, Apr. 16-Apr. 20, 2018.

NTT Docomo, Inc. "Search space" 3GPP TSG RAN WG1 Meeting #92, R1-1802480 (Mar. 2, 2018).

CATT, "Power saving signal/channel design and performance" 3GPP TSG RAN WG1 Meeting #98Bis,R1-1910353 (Oct. 20, 2019).

* cited by examiner

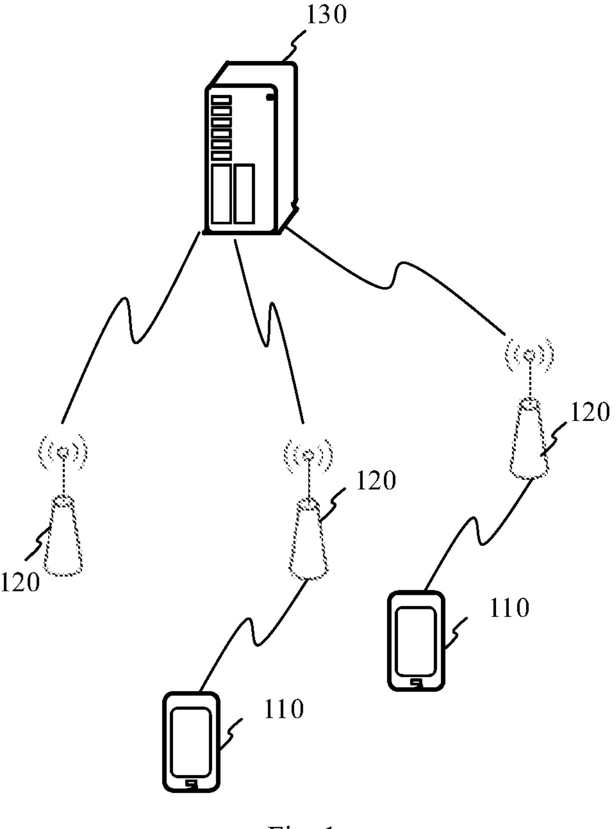

Fig. 1

Determine configuration information of at least one target search space set, where the configuration information includes group identifier information of the at least one target search space set

S201

Determine a set of positions for physical downlink control channel (PDCCH) candidate control channel element (CCE) of the at least one target search space set according to the configuration information of the at least one target search space set and a hash function

Determine configuration information of at least one target search space set, where the configuration information includes group identifier information of the at least one target search space set

S301

Obtain a set of positions for PDCCH candidate CCE of the at least one target search space set by inputting the group identifier information of the at least one target search space set into a hash function formula

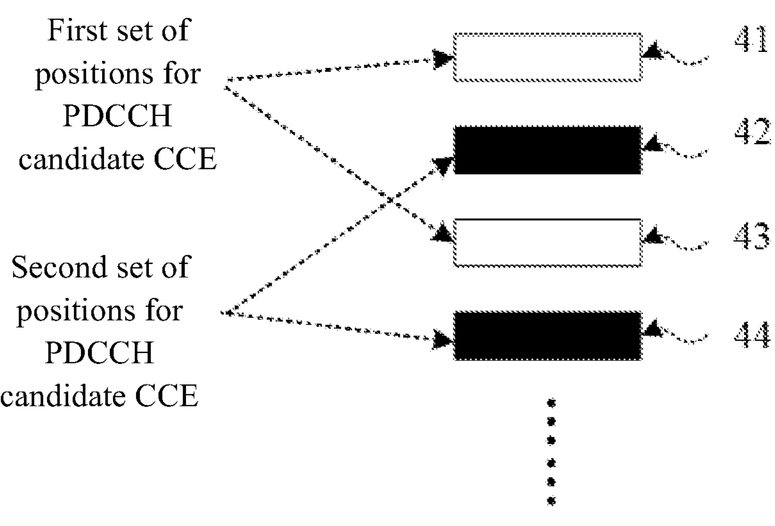

Fig. 4

METHOD AND APPARATUS FOR DETERMINING POSITION OF CONTROL CHANNEL ELEMENT, AND STORAGE MEDIUM

CROSS REFERENCE TO RELATED APPLICATION

The present application is a U.S. National Stage of International Application No. PCT/CN2020/121290, filed on Oct. 15, 2020, the contents of all of which are incorporated herein by reference in their entireties for all purposes.

BACKGROUND

For transmission through a physical downlink control channel (PDCCH) in a radio communication system, a communication device needs to determine a PDCCH candidate control channel element (CCE) position set for a search space set.

SUMMARY

According to a first aspect of examples of the disclosure, a method for determining a position of a control channel element is provided, and includes: determining configuration information of at least one target search space set; and determining, according to the configuration information of the search space set and a hash function, a set of positions for PDCCH candidate CCE of the at least one target search space set; where the configuration information includes group identifier information of the at least one target search space set.

According to a second aspect of the examples of the disclosure, an apparatus for determining a position of a control channel element is provided. The apparatus includes: a processor; an a memory configured to store an instruction executable by the processor; where the processor is configured to: determine configuration information of a search space set; and determine, according to the configuration information of the at least one target search space set and a hash function, a set of positions for physical downlink control channel (PDCCH) candidate control channel element (CCE) of the at least one target search space set; where the configuration information includes group identifier information of the at least one target search space set.

According to a third aspect of the examples of the disclosure, a non-transitory computer-readable storage medium is provided. The non-transitory computer-readable storage medium includes an executable instruction, the executable instruction implementing the above method for determining a position of a control channel element when called up by a processor of a communication device.

According to a fourth aspect of the examples of the disclosure, a computer program product or a computer program is provided. The computer program product or the computer program includes a computer instruction stored in a computer-readable storage medium. A processor of a computer device reads the computer instruction from the computer-readable storage medium, and the processor executes the computer instruction, such that the computer device executes the method for determining a position of a control channel element.

It should be understood that the above general description and the following detailed description are merely illustrative, and cannot limit the disclosure.

BRIEF DESCRIPTION OF THE DRAWINGS

The drawings here are incorporated into the description as a constituent part of the description, illustrate examples conforming to the disclosure, and serve to explain principles of the disclosure along with the description.

FIG. 1 is a schematic diagram of an implementation environment involved in a method for determining a position of a control channel element according to an example;

FIG. 2 is a flowchart of a method for determining a position of a control channel element according to an example;

FIG. 3 is a flowchart of a method for determining a position of a control channel element according to an example;

FIG. 4 is a diagram showing distribution of control channel element (CCE) position sets according to the example shown in FIG. 3;

DETAILED DESCRIPTION

Figure 5:
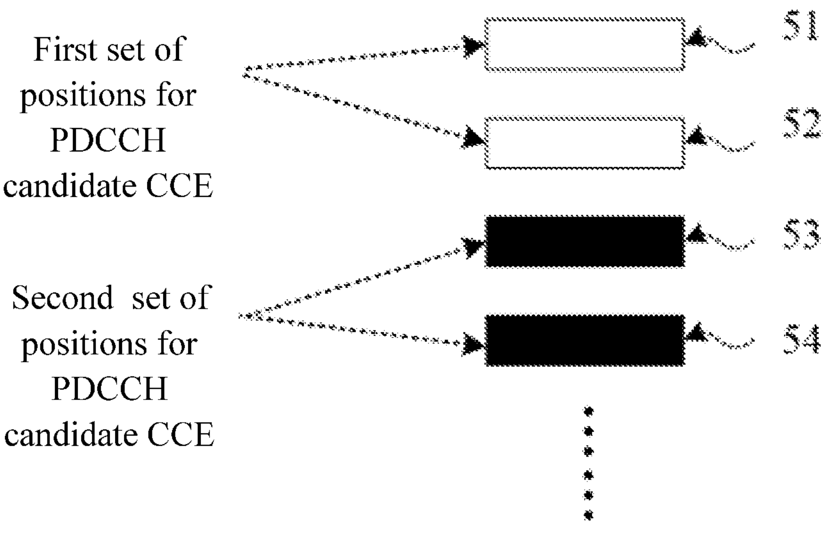
FIG. 5 is another diagram showing distribution of CCE position sets according to the example shown in FIG. 3.

Examples will be described in detail here, instances of which are shown in accompanying drawings. When the following description involves the accompanying drawings, the same numbers in different accompanying drawings represent the same or similar elements unless otherwise indicated. Embodiments described in the following examples do not represent all embodiments consistent with the disclosure. On the contrary, these embodiments are merely instances of apparatuses and methods consistent with some aspects of the disclosure as detailed in the appended claims.

It should be understood that in the description, "several" means one or more, and "plurality" means two or more. "and/or" is used to describe an association between associated objects and means three relations, for example, A and/or B can mean A alone, both A and B, and B alone. The character "/" generally indicates that the associated objects in the context are in an "or" relation.

In new radio (NR) of the 5th-Generation (5G) mobile communication, especially when a communication frequency band is in frequency range 2, due to rapid attenuation of a high-frequency channel, it is necessary to use beam-based transmission and reception for guaranteeing a coverage.

When a base station has multi-transmission and reception points (TRP), the base station may use the plurality of TRPs to provide services for a terminal, including use of the multi-TRPs to send a physical downlink control channel (PDCCH) to the terminal. In a traditional method, when a base station uses a TRP to send a PDCCH to a terminal, a transmission configuration indication (TCI) state is configured for a control resource set (CORESET), so a TCI state of a search space set (SS set) associated with the CORESET is the same as the TCI state of the CORESET.

When a repeated transmission method of PDCCHs through multi-TRPs is used, equivalently, the terminal needs to use beams corresponding to different TCI states to receive the PDCCHs sent by different TRPs, these PDCCHs may come from different search space sets, and different search space sets belong to the same CORESET, that is, the CORESET corresponds to multi-TCI states. For correspondence to different search spaces and different frequency domain resources of different TCI states, that is, support of frequency division multiplexing (FDM), it is necessary that frequency domain positions of PDCCH candidate CCE position sets corresponding to a plurality of search space sets are different.

However, in the related art, the set of positions for PDCCH candidate CCE corresponding to the search space set is computed based on the aggregation level, the maximum number of PDCCH candidates at the aggregation level, the number of CCEs in the CORESET, carrier-related parameters, etc., that is, for different search space sets, if the search space sets correspond the same aggregation level and in the same slot, then for the same terminal, positions of PDCCH candidate CCE position sets of the plurality of search space sets corresponding to the terminal are partially or completely the same.

The disclosure relates to the technical field of radio communication, in particular to a method and apparatus for determining a position of a control channel element, and a storage medium.

Various examples related to the disclosure show a solution for computing the Set of positions for PDCCH candidate CCE of the search space set, which may determine the Set of positions for PDCCH candidate CCEs with different frequency domain positions for different search space sets and satisfy the requirement of repeated transmission through a PDCCH through the Multi-TRPs accordingly.

FIG. 1 is a schematic diagram of an implementation environment involved in a method for determining a position of a control channel element according to a partial example. As shown in FIG. 1, the implementation environment may include: several user devices 110 and a base station 120.

The user device 110 may support cellular mobile communication technology, for example, the 5th generation mobile communication (5G) technology. Alternatively, the user device 110 may also support the next generation mobile communication technology of 5G technology.

For example, alternatively, the user device 110 may also be a user terminal device, such as a mobile phone (or called a "cellular" phone) and a computer with a mobile terminal, for example, a portable, pocket-type, handheld, computer built-in or vehicle-mounted apparatus. For example, the user device may be a station (STA), a subscriber unit, a subscriber station, a mobile station, a mobile, a remote station, an access point, a remote terminal, an access terminal, a user terminal, a user agent, a user device or user equipment (UE). Specifically, for example, the user device 110 may be a mobile terminal such as a smart phone, a tablet computer, an e-book reader, or a smart wearable device such as smart glasses, a smart watch or a smart bracelet.

Alternatively, the user device 110 may be a vehicle-mounted communication device, for example, an electronic control unit having a radio communication function, or a radio communication device externally connected with an electronic control unit.

Alternatively, the user device 110 may also be a roadside device, such as a street lamp, a signal lamp or other roadside devices having a radio communication function.

The base station 120 may be a network-side device in a radio communication system. Alternatively, the radio communication system may be a the 5G system, also known as the NR system. Alternatively, the radio communication system may be a next generation system of the 5G system.

The base station 120 may be a base station (gNB) having a centralized distributed architecture in the 5G system. When in the centralized distributed architecture, the base station 120 usually includes a central unit (CU) and at least two distributed units (DU). Protocol stacks of a packet data convergence protocol (PDCP) layer, a radio link control (RLC) layer and a media access control (MAC) layer are arranged in the central unit. A physical (PHY) layer protocol stack is arranged in the distributed unit. A specific embodiment of the base station 120 is not limited in the example of the disclosure.

A radio connection may be established between the base station 120 and the user device 110 through a radio. The radio is a radio based on the fifth generation mobile communication network technology (5G) standard, for example, the radio is the new radio, or the radio may also be a radio based on the next generation mobile communication network technology of 5G.

Alternatively, the above radio communication system may further include a network management device 130.

Several base stations 120 are separately connected to the network management device 130. The network management device 130 may be a core network device in the radio communication system, for example, the network management device 130 may be a mobility management entity (MME) in an evolved packet core network (EPC). Alternatively, the network management device may be other core network devices, such as serving gateway (SGW), public data network gateway (PGW), a policy and charging rules function (PCRF) or a home subscriber server (HSS). An implementation form of the network management device 130 is not limited in the example of the disclosure.

FIG. 2 is a flowchart of a method for determining a position of a control channel element according to an example. The method for determining a position of a control channel element may be executed by a communication device, such as the user device 110 or the base station 120 in the implementation environment shown in FIG. 1. As shown in FIG. 2, the method includes steps S201 and S202.

In step S201, configuration information of at least one target search space set is determined; and In step S202, a set of positions for PDCCH candidate CCE of the at least one target search space set is determined according to the configuration information of the at least one target search space set and a hash function. Where the configuration information includes group identifier information of the at least one target search space set.

For example, the communication device is taken as a terminal, the terminal computes a first Set of positions for PDCCH candidate CCE and a second set of positions for PDCCH candidate CCE in the same time slot according to configuration information of a first search space set (first SS set) and configuration information of a second search space set (second SS set) as well as the hash function formula. The first set of positions for PDCCH candidate CCE corresponds to the first SS set, and the second set of positions for PDCCH candidate CCE corresponds to the second SS set. In addition, because the configuration information of the two SS sets is different, the first set of positions for PDCCH candidate CCE and the second set of positions for PDCCH candidate CCE are different.

In a possible embodiment, In step S202, that a set of positions for PDCCH candidate CCE of the at least one target search space set is determined according to the configuration information of the at least one target search space set and a hash function includes: the set of positions for PDCCH candidate CCE of the at least one target search space set is obtained by inputting the group identifier information of the at least one target search space set into a hash function formula.

In a possible embodiment, in response to determining that the at least one target search space set includes at least two search space sets, a first set of positions for PDCCH candidate CCE corresponding to a first search space set and a second set of positions for PDCCH candidate CCE corresponding to a second search space set are distributed in a comb cross manner, the first search space set and the second search space set being any two among the at least two search space sets.

In a possible embodiment, the hash function formula includes a first hash function formula, the first hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where K represents the group identifier information of the search at least one target space set, and K equals an integer greater than or equal to 0.

In a possible embodiment, the hash function formula includes a second hash function formula, the second hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}\right\}\bmod\lfloor N_{CCE,p}/L\rfloor+i;$$

where $m_{s,n_{CI}}$ represents an enhanced PDCCH candidate identifier; and enhanced PDCCH candidate identifiers of respective PDCCH candidates of the at least two search space sets are determined by PDCCH candidate identifiers of the at least two search space sets.

In a possible embodiment, in response to determining that the at least one target search space set includes at least two search space sets, there is no overlap between a minimum continuous position interval corresponding to the first set of positions for PDCCH candidate CCE of the first search space set and a minimum continuous position interval corresponding to the second set of positions for PDCCH candidate CCE of the second search space set. The minimum continuous position interval being an interval from a first CCE position to a last CCE position in a corresponding set of positions for PDCCH candidate CCE, and the first search space set and the second search space set being any two among the at least two search space sets.

In a possible embodiment, the hash function formula includes a third hash function formula, the third hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}\right\}\bmod\lfloor N_{CCE,p}/L\rfloor+i;$$

where for a search space set with group identifier information of 0, $m_{s,n_{CI}}$ represents a PDCCH candidate identifier in the search space set with group identifier information of 0. Additionally, for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

In a possible embodiment, PDCCH candidate CCE of the at least two search space sets are in the same time slot, and the at least two search space sets correspond to the same control resource set.

In a possible embodiment, the at least two search space sets correspond to different beam direction identifiers.

In a possible embodiment, the group identifier information of the at least one target search space set is obtained according to a grouping result of grouping search space sets, and search space sets in the same search space set group correspond to the same beam direction identifier.

In a possible embodiment, the group identifier information of the at least one target search space set is identifier information obtained after renumbering, in an ascending order, specified identifiers in search space set groups obtained through grouping, the specified identifier being an identifier of a search space set with a minimum identifier in a corresponding search space set group, and alternatively, the specified identifier being an identifier of a search space set with a maximum identifier in a corresponding search space set group.

In a possible embodiment, the group identifier information of the at least one target search space set is identifier information obtained after renumbering beam direction identifiers corresponding to search space set groups obtained through grouping.

Thus, according to the solution shown in the example of the present disclosure, when the set of positions for PDCCH candidate CCE of the search at least one target space set is computed, the configuration information of the at least one target search space set is introduced by combining the hash function. In other words, the determined set of positions for PDCCH candidate CCE of the at least one target search space set is related to the configuration information of the at least one target search space set, that is, the group identifier information of the at least one target search space set. For two or more search space sets with different group identifier information, even if the at least one target search space sets correspond to the same CORESET, at the same aggregation level, and in the same time slot, set of positions for PDCCH candidate CCEs may not overlap each other, thus satisfying the requirement of repeated transmission through a PDCCH under multi-transmission and reception points (TRP) of frequency-division multiplexing (FDM), and improving transmission reliability of the PDCCH.

FIG. 3 is a flowchart of a method for determining a position of a control channel element according to an example. The method for determining a position of a control channel element may be executed by a communication device, such as the user device 110 or the base station 120 in the implementation environment shown in FIG. 1. As shown in FIG. 3, the method includes steps S301 and S302.

In step S301, configuration information of at least one target search space set is determined.

In a possible embodiment, the communication device obtains configuration information of a single search space set.

In other words, the solution shown in the example of the present disclosure may be applied to a scenario where the set of positions for PDCCH candidate CCE is determined separately for one search space set, for example, in a scenario where the PDCCH is sent through a single TRP.

In a possible embodiment, the communication device obtains configuration information of at least two single search space sets, that is to say, the at least one target search space set obtained by the communication device includes at least two search space sets.

PDCCH candidate CCE of the at least two search space sets are in the same time slot, and the at least two search space sets correspond to the same control resource set. Further, aggregation levels of PDCCH candidates of the at least two search space sets are the same.

The solution shown in the example of the present disclosure may also be applied to a scenario where CCEs of respective PDCCH candidates of two or more search space sets corresponding to the same control resource set are in the same slot, and the set of positions for PDCCH candidate CCE of two or more search space sets corresponding to the same control resource set are determined, for example, in a scenario where a PDCCH is sent to the same terminal through multi-TRPs.

In a possible embodiment, the at least two search space sets correspond to different beam direction identifiers.

For example, in the above scenario where the PDCCH is sent to the same terminal through the multi-TRPs, the at least two search space sets obtained by the communication device correspond to one beam direction identifier each, and beam direction identifiers corresponding to the at least two search space sets are different, that is, the at least two search space sets correspond to different beam directions.

In a possible embodiment, the at least two search space sets obtained by the above communication device correspond to different TRPs respectively.

In a possible embodiment, the configuration information above of the at least one target search space set includes group identifier information of the at least one target search space set.

In a possible embodiment, the group identifier information of the at least one target search space set is obtained according to a grouping result of grouping search space sets, and search space sets in the same search space set group correspond to the same beam direction identifier.

In the example of the present disclosure, the communication device groups the search space sets, allocates search space sets corresponding to the same beam direction identifier to the same search space set group, and sets the group identifier information for search space set groups. In an illustrative solution, when determining the configuration information of the at least one target search space set, the communication device may take the group identifier information of the at least one target search space set group where the at least one target search space set is located as the configuration information of the at least one target search space set.

In a possible embodiment, when obtaining at least two search space sets, the communication device obtains one search space set from each search space set group, so as to guarantee configuration information of at least two obtained search space sets different.

In a possible embodiment, the group identifier information of the at least one target search space set is identifier information obtained after renumbering, in an ascending order, specified identifiers in search space set groups obtained through grouping, the specified identifier being an identifier of a search space set with a minimum identifier in a corresponding search space set group, and alternatively, the specified identifier being an identifier of a search space set with a maximum identifier in a corresponding search space set group.

In the example of the present disclosure, after grouping the at least one target search space sets, the communication device determines an identifier of a search space set that satisfies a specified condition from the at least one target search space set, where the specified condition may be a minimum identifier in a corresponding search space set group or the maximum identifier in the corresponding search space set group.

By taking the above specified condition being the minimum identifier in the corresponding search space set group as an example, the communication device obtains identifiers of search space sets with minimum identifiers from the search space set groups respectively, and renumbers the obtained identifiers of the search spaces in an ascending order to obtain the group identifier information of the search space set groups.

For example, two SS set groups in the same slot are a first SS set group and a second SS set group respectively. An identifier of a search space set with a minimum identifier in the first SS set group is SS set #3, an identifier of a search space set with a minimum identifier in the second SS set group is SS set #5. After renumbering in an ascending order, group identifier information of the first SS set group is ID #0, that is, K in a first hash function formula equals 0; and group identifier information of the second SS set group may be ID #1, that is, K in the first hash function formula equals 1.

In a possible embodiment, the group identifier information of the at least one target search space set is identifier information obtained after renumbering beam direction identifiers corresponding to search space set groups obtained through grouping.

In the example of the present disclosure, after the communication device groups the search space sets, since search space set groups each corresponds to the same beam direction identifier, the communication device may obtain beam direction identifiers corresponding to the search space set groups, and then renumber the beam direction identifiers in an ascending order or a descending order to obtain the group identifier information of the search space set groups.

For example, two SS set groups in the same slot are a first SS set group and a second SS set group respectively. A beam direction identifier corresponding to the first SS set group is beam #4, a beam direction identifier corresponding to the second SS set group is beam #2. After the communication device renumbers the beam direction identifiers in an ascending order, group identifier information of the second SS set group is ID #0, that is, K in a first hash function formula equals 0; and group identifier information of the first SS set group may be ID #1, that is, K in the first hash function formula equals 1.

In a possible embodiment, the above beam direction identifier may be a transmission configuration indication (TCI) state identifier (such as a downlink TCI state identifier and an uplink TCI state identifier), a SpatialRelationInfo identifier, etc.

Referring back to FIG. 3 in step S302, the set of positions for PDCCH candidate CCE of the at least one target search space set is obtained by inputting the group identifier information of the at least one target search space set into a hash function formula.

In the example of the present disclosure, the communication device may compute the set of positions for PDCCH candidate CCE of the at least one target search space set by inputting parameters including the group identifier information of the at least one target search space set into a hash function.

In a possible embodiment, in response to determining that the at least one target search space set includes at least two search space sets, a first set of positions for PDCCH candidate CCE corresponding to a first search space set and a second set of positions for PDCCH candidate CCE corresponding to a second search space set are distributed in a comb cross manner, the first search space set and the second search space set being any two among the at least two search space sets.

In a possible embodiment, the hash function formula includes a first hash function formula, the first hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE.p}/L\rfloor+i; \tag{1}$$

where in the above formula (1), K represents the group identifier information of the at least one target search space set, and K equals an integer greater than or equal to 0.

In the above formula (1), L represents an aggregation level, $$Y_{p,n^{u}_{s,f}}$$

represents an initial value, $$M^{(L)}_{s,max}$$

represents the maximum number of PDCCH candidates at the aggregation level, $m_{s,n_{CI}}$ represents the number of PDCCH candidates configured for a terminal, $N_{CCE,\ p}$ represents the number of CCEs included in a control resource set, and $n_{CI}$ represents a carrier parameter, $i\in[0, L-1]$.

In a possible embodiment, when the above search space set includes at least two search space sets, $$M^{(L)}_{s,max}$$

in the above formula (1) represents the total number of PDCCH candidates at the aggregation level of L of the at least two search space sets or $$M^{(L)}_{s,max}$$

represents the number of PDCCH candidates at aggregation level of L of search space sets in the above at least two search space sets.

In the example of the present disclosure, by taking two search space sets corresponding to the same slot and the same control resource set as an example, for PDCCH candidates at the same aggregation level, when the first Set of positions for PDCCH candidate CCE and the second Set of positions for PDCCH candidate CCE are computed by the above formula (1), the first set of positions for PDCCH candidate CCE and the second set of positions for PDCCH candidate CCE are distributed in a comb cross manner.

For example, with reference to FIG. 4, a diagram showing distribution of CCE position sets according to the example of the present disclosure is shown. As shown in FIG. 4, the first set of positions for PDCCH candidate CCE and the second set of positions for PDCCH candidate CCE have frequency positions of first PDCCH candidate #1 CCE position 41, second PDCCH candidate #1 CCE position 42, first PDCCH candidate #2 CCE position 43, second PDCCH candidate #2 CCE position 44, and so on. In a possible embodiment, the two adjacent PDCCH candidate positions are not continuous, that is, there may be a PDCCH candidate CCE of another terminal between the two adjacent PDCCH candidate positions.

In order to achieve the above effect, the configuration information of the SS set, that is, the group identifier information of the search space set, that is, the ID value may be added after n in formula (1), and the ID value is K in the above formula (1).

In a possible embodiment, the above hash function formula includes a second hash function formula, the second hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}\right\}\bmod\lfloor N_{CCE,p}/L\rfloor+i; \tag{2}$$

where $m_{s,n_{CI}}$ represents an enhanced PDCCH candidate identifier in the above formula (2) different from the above formula (1); and enhanced PDCCH candidate identifiers of respective PDCCH candidates of the above at least two search space sets are determined by PDCCH candidate identifiers of the at least two search space sets.

In a possible embodiment, when the above search space set includes at least two search space sets, $$M^{(L)}_{s,max}$$

in the above formula (2) represents the total number of PDCCH candidates at the aggregation level of L of the at least two search space sets or $$M^{(L)}_{s,max}$$

represents the number of PDCCH candidates at aggregation level of L of search space sets in the above at least two search space sets.

For example, the number of PDCCH candidates at aggregation level L of 4 in SS set 1 is four, and the number of PDCCH candidates at aggregation level L of 4 in SS set 2 is also four.

A group identifier corresponding to SS set 1 is set as 0, and a group identifier corresponding to SS set 2 is set as 1.

Based on a traditional method, m of PDCCH candidates of the two SS set equals 0, 1, 2 or 3. Based on the method shown in the above formula (2), m of the four PDCCH candidate in SS set 1 equals 0, 2, 4 or 6, and m of the four PDCCH candidate in SS set 2 equals 1, 3, 5 or 7. That is, the total number of PDCCH candidates with L of 4 in these two SS set is 8, m equals 0, 1, 2, 3, 4, 5, 6 or 7, and m of the PDCCH candidates of the two SS sets equals 0, 2, 4 or 6 and 1, 3, 5 or 7 respectively, then the two sets of positions for PDCCH candidate CCE computed by combining the above m and the above formula (2) are distributed in a comb cross manner, so as to achieve the effect that the sets of positions for PDCCH candidate CCE are staggered.

Further, $$M_{s,max}^{(L)}$$

equals the number of respective PDCCH candidates at aggregation level L of 4 in the search space, that is, $$M_{s,max}^{(L)}$$

equals 4; or M equals the total number of PDCCH candidates at aggregation level L of 4 in two search spaces, that is, $$M_{s,max}^{(L)}$$

equals 8.

In a possible embodiment, in response to determining that the at least one target search space set includes at least two search space sets, there is no overlap between a minimum continuous position interval corresponding to the first set of positions for PDCCH candidate CCE of the first search space set and a minimum continuous position interval corresponding to the second set of positions for PDCCH candidate CCE of the second search space set, the minimum continuous position interval being an interval from a first CCE position to a last CCE position in a corresponding set of positions for PDCCH candidate CCE, and the first search space set and the second search space set being any two among the at least two search space sets.

In a possible embodiment, the hash function formula includes a third hash function formula, the third hash function formula being expressed as follows:

$$L\cdot\left\{Y_{p,n_{s,f}^{u}}+\left\lfloor\frac{m_{s,n_{CI}}\cdot N_{CCE,p}}{L\cdot M_{s,max}^{(L)}}\right\rfloor+n_{CI}\right\}\bmod\lfloor N_{CCE,p}/L\rfloor+i; \tag{3}$$

In the above formula (3), L represents an aggregation level, $$Y_{p,n_{s,f}^{u}}$$

represents an initial value, $$M_{s,max}^{(L)}$$

represents the maximum number of PDCCH candidates at the aggregation level, $N_{CCE,\ p}$ represents the number of CCEs included in a control resource set, and $n_{CI}$ represents a carrier parameter $i \in [0, L-1]$.

$$Y_{p,n_{s,f}^{u}}$$

represents the initial value related to a cell radio network temporary identifier and a slot number of the terminal, that is, $$Y_{p,n_{s,f}^{u}}$$

may be determined according to the cell radio network temporary identifier and the slot number of the terminal.

In a possible embodiment, when the above search space set includes at least two search space sets, $$M_{s,max}^{(L)}$$

in the above formula (3) represents the total number of PDCCH candidates at the aggregation level of L of the at least two search space sets or $$M_{s,max}^{(L)}$$

represents the number of PDCCH candidates at aggregation level of L of search space sets in the above at least two search space sets.

Different from the above formula (1) and the above formula (2), in the above formula (3), for the PDCCH candidate at the aggregation level of L, for a search space set with group identifier information of 0, $m_{s,n_{CI}}$ represents a PDCCH candidate identifier in the search space set with group identifier information of 0; and for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

For example, when j in the above formula (3) equals 0, formula (3) is equivalent to a traditional hash function formula. Assuming that the number of PDCCH candidates at aggregation level L of 4 is 4, m equals 0, 1, 2 or 3.

Another example is that when j equals 1 and the number of PDCCH candidates at aggregation level L of 4 is also 4, a number of the PDCCH candidate in this search space set is to be plus the number of PDCCH candidates of a first search space set, that is, numbers of the PDCCH candidates become 0+4, 1+4, 2+4 and 3+4.

Further, $$M_{s,max}^{(L)}$$

equals the number of respective PDCCH candidates at aggregation level L of 4 in the search space, that is, $$M_{s,max}^{(L)}$$

equals 4; or M equals the total number of PDCCH candidates at aggregation level L of 4 in two search spaces, that is, $$M_{s,max}^{(L)}$$

equals 8.

By taking two search space sets corresponding to the same slot and the same control resource set as an example, when the first Set of positions for PDCCH candidate CCE and the second set of positions for PDCCH candidate CCE are computed by the above formula (3), a minimum continuous position interval of the first set of positions for PDCCH candidate CCE does not overlap a minimum continuous position interval of the second set of positions for PDCCH candidate CCE.

For example, with reference to FIG. 5, another diagram showing distribution of CCE position sets according to the example of the present disclosure is shown. As shown in FIG. 5, the first set of positions for PDCCH candidate CCE and the second set of positions for PDCCH candidate CCE have frequency positions arranged as follows: first PDCCH candidate #1 CCE position 51, first PDCCH candidate #2 CCE position 52, second PDCCH candidate #1 CCE position 53, and second PDCCH candidate #2 CCE position 54.

In order to achieve separately continuity of the above two sets of positions for PDCCH candidate CCE, the hash function of the first set of positions for PDCCH candidate CCE remains unchanged. Positions of the second set of positions for PDCCH candidate CCE needs to be overall behind a position of a last CCE of a last PDCCH candidate in the first set of positions for PDCCH candidate CCE.

By taking determining sets of positions for PDCCH candidate CCE corresponding to two search space sets as an example, through the above formula (2), CCEs of the second set of positions for PDCCH candidate CCE are overall translated to a position behind the last CCE of the first set of positions for PDCCH candidate CCE. For example, the CCEs of the first set of positions for PDCCH candidate CCE are among 0-31 CCEs, and the CCEs of the second set of positions for PDCCH candidate CCE are after the CCE numbered 31.

In the example of the present disclosure, a back computed number of the PDCCH candidate does not mean that a frequency domain position of a CCE is necessarily located back. In other words, assuming that a direction from front to back means from a low frequency to a high frequency, since the frequency domain position of the first PDCCH candidate may start at any position in the whole frequency domain, and if a frequency domain position corresponding to a subsequent number exceeds a highest frequency position in the entire frequency domain, the frequency domain position is computed circularly from the lowest frequency. Thus, a CCE included in a high-numbered PDCCH candidate does not have a high frequency domain position necessarily.

In the solution shown in the example of the present disclosure, it is proposed that when the base station uses multi-TRPs to send the PDCCH service to the terminal, and different SS sets of the same CORESET correspond to different TRPs, the set of positions for PDCCH candidate CCE is computed by introducing the configuration information of different SS sets into the hash function, such that different SS sets may support transmission of the PDCCH through the multi-TRP in an FDM manner, and a success rate of downlink control information (DCI) signaling decoding is improved.

According to the solution shown in the example of the present disclosure, when the set of positions for PDCCH candidate CCE of the at least one target search space set is computed, the configuration information of the at least one target search space set is introduced by combining the hash function. Thus, the determined set of positions for PDCCH candidate CCE of the search at least one space set is related to the configuration information of the at least one target search space set, that is, the group identifier information of the at least one target search space set. For two or more search space sets with different group identifier information, even if the search space sets correspond to the same CORESET, at the same aggregation level, and in the same time slot, sets of positions for PDCCH candidate CCE may not overlap each other, thus satisfying the requirement of repeated transmission through a PDCCH under multi-transmission and reception points (TRP) of frequency-division multiplexing (FDM), and improving transmission reliability of the PDCCH.

An example of the apparatus of the disclosure is described below, and can be used to execute the examples of the method of the disclosure. For details not disclosed in the example of the apparatus of the disclosure, reference can be made to the examples of the method of the disclosure.

Figure 6:
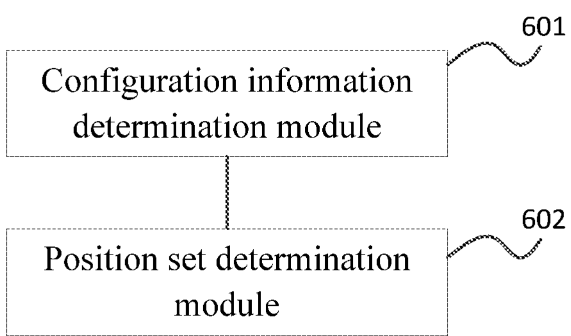
FIG. 6 is a block diagram of an apparatus for determining a position of a control channel element according to an example.

FIG. 6 is a block diagram of an apparatus for determining a position of a control channel element according to an example. As shown in FIG. 6, the apparatus for determining a position of a control channel element may be used in the user device 110 or the base station 120 in the implementation environment shown in FIG. 1 to execute all or some steps in the example shown in FIG. 2 or FIG. 3. The apparatus for determining a position of a control channel element may include a configuration information obtaining module 601 and a position set determination module 602.

The configuration information obtaining module 601 is configured to determine configuration information of at least one target search space set.

The position set determination module 602 is configured to determine a set of positions for PDCCH candidate CCE of the at least one target search space set according to the configuration information of the at least one target search space set and a hash function; where the configuration information includes group identifier information of the at least one target search space set.

In a possible embodiment, the position set determination module 602 is configured to obtain the set of positions for PDCCH candidate CCE of the at least one target search space set by inputting the group identifier information of the at least one target search space set into a hash function formula.

In a possible embodiment, in response to determining that the at least one target search space set includes at least two search space sets, a first set of positions for PDCCH candidate CCE corresponding to a first search space set and a second set of positions for PDCCH candidate CCE corresponding to a second search space set are distributed in a comb cross manner. The first search space set and the second search space set being any two among the at least two search space sets.

In a possible embodiment, the hash function formula includes a first hash function formula, the first hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where K represents the group identifier information of the at least one target search space set, and K equals an integer greater than or equal to 0.

In a possible embodiment, the hash function formula includes a second hash function formula, the second hash function formula being expressed as follows:

$$L \cdot \left\{ Y_{p,n^u_{s,f}} + \left\lfloor \frac{m_{s,n_{CI}} \cdot N_{CCE,p}}{L \cdot M^{(L)}_{s,max}} \right\rfloor + n_{CI} \right\} \bmod \lfloor N_{CCE,p}/L \rfloor + i;$$

where $m_{s,n_{CI}}$ represents an enhanced PDCCH candidate identifier; and enhanced PDCCH candidate identifiers of respective PDCCH candidates of the at least two search space sets are determined by PDCCH candidate identifiers of the at least two search space sets.

In a possible embodiment, in response to determining that the at least one target search space set includes at least two search space sets, there is no overlap between a minimum continuous position interval corresponding to the first set of positions for PDCCH candidate CCE of the first search space set and a minimum continuous position interval corresponding to the second set of positions for PDCCH candidate CCE of the second search space set. The minimum continuous position interval being an interval from a first CCE position to a last CCE position in a corresponding set of positions for PDCCH candidate CCE, and the first search space set and the second search space set being any two among the at least two search space sets.

In a possible embodiment, the hash function formula includes a third hash function formula, the third hash function formula being expressed as follows:

$$L \cdot \left\{ Y_{p,n^u_{s,f}} + \left\lfloor \frac{m_{s,n_{CI}} \cdot N_{CCE,p}}{L \cdot M^{(L)}_{s,max}} \right\rfloor + n_{CI} \right\} \bmod \lfloor N_{CCE,p}/L \rfloor + i;$$

where for a search space set with group identifier information of 0, $m_{s,n_{CI}}$ represents a PDCCH candidate identifier in the search space set with group identifier information of 0; and for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

In a possible embodiment, PDCCH candidate CCE of the at least two search space sets are in the same time slot, and the at least two search space sets correspond to the same control resource set.

In a possible embodiment, the at least two search space sets correspond to different beam direction identifiers.

In a possible embodiment, the group identifier information of the at least one target search space set is obtained according to a grouping result of grouping search space sets, search space sets in the same search space set group correspond to the same beam direction identifier.

In a possible embodiment, the group identifier information of the at least one target search space set is identifier information obtained after renumbering, in an ascending order, specified identifiers in search space set groups obtained through grouping, the specified identifier being an identifier of a search space set with a minimum identifier in a corresponding search space set group, and alternatively, the specified identifier being an identifier of a search space set with a maximum identifier in a corresponding search space set group.

In a possible embodiment, the group identifier information of the at least one target search space set is identifier information obtained after renumbering beam direction identifiers corresponding to search space set groups obtained through grouping.

According to the solution shown in the example of the present disclosure, when the set of positions for PDCCH candidate CCE of the at least one target search space set is computed, the configuration information of the at least one target search space set is introduced by combining the hash function, that is to say, the determined set of positions for PDCCH candidate CCE of the at least one target search space set is related to the configuration information of the at least one target search space set, that is, the group identifier information of the at least one target search space set. For two or more search space sets with different group identifier information, even if the search space sets correspond to the same CORESET, at the same aggregation level, and in the same time slot, sets of positions for PDCCH candidate CCE may not overlap each other, thus satisfying the requirement of repeated transmission through a PDCCH under multi-transmission and reception points (TRP) of frequency-division multiplexing (FDM), and improving transmission reliability of the PDCCH.

Further, when the apparatus according to the above example implements its function, the description is merely made by taking division of the above functional modules as an example. In an actual application, the above function allocation can be completed by different functional modules according to actual demands, that is, a content structure of the device is divided into different functional modules to complete all or some functions above.

With respect to the apparatus in the above example, specific ways in which the modules execute operations have been described in detail in the examples relating to the method, and will not be described in detail here.

An example of the disclosure provides the apparatus for determining a position of a control channel element, which may implement all or some steps in the example shown in FIG. 2 or FIG. 3. The apparatus for determining a position of a control channel element includes a processor, and a memory for storing an instruction executable by the processor. The processor being configured to: determine configuration information of at least one target search space set; and determine a set of positions for PDCCH candidate CCE of the at least one target search space set according to the configuration information of the at least one target search space set and a hash function. Where the configuration information includes group identifier information of the at least one target search space set.

In a possible embodiment, the determining a set of positions for PDCCH candidate CCE of the at least one target search space set according to the configuration information of the at least one target search space set and a hash function includes: the set of positions for PDCCH candidate CCE of the at least one target search space set is obtained by inputting the group identifier information of the at least one target search space set into a hash function formula.

In a possible embodiment, in response to determining that the at least one target search space set includes at least two search space sets, a first set of positions for PDCCH candidate CCE corresponding to a first search space set and a second set of positions for PDCCH candidate CCE corresponding to a second search space set are distributed in a comb cross manner. The first search space set and the second search space set being any two among the at least two search space sets.

In a possible embodiment, the hash function formula includes a first hash function formula, the first hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where K represents the group identifier information of the at least one target search space set, and K equals an integer greater than or equal to 0.

In a possible embodiment, the hash function formula includes a second hash function formula, the second hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where $m_{s,n_{CI}}$ represents an enhanced PDCCH candidate identifier; and enhanced PDCCH candidate identifiers of respective PDCCH candidates of the at least two search space sets are determined by PDCCH candidate identifiers of the at least two search space sets.

In a possible embodiment, in response to determining that the at least one target search space set includes at least two search space sets, there is no overlap between a minimum continuous position interval corresponding to the first set of positions for PDCCH candidate CCE of the first search space set and a minimum continuous position interval corresponding to the second set of positions for PDCCH candidate CCE of the second search space set. The minimum continuous position interval being an interval from a first CCE position to a last CCE position in a corresponding set of positions for PDCCH candidate CCE, and the first search space set and the second search space set being any two among the at least two search space sets.

In a possible embodiment, the hash function formula includes a third hash function formula, the third hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where for a search space set with group identifier information of 0, $m_{s,n_{CI}}$ represents a PDCCH candidate identifier in the search space set with group identifier information of 0; and for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

In a possible embodiment, PDCCH candidate CCE of the at least two search space sets are in the same time slot, and the at least two search space sets correspond to the same control resource set.

In a possible embodiment, the at least two search space sets correspond to different beam direction identifiers.

In a possible embodiment, the group identifier information of the at least one target search space set is obtained according to a grouping result of grouping search space sets, and search space sets in the same search space set group corresponding to the same beam direction identifier.

In a possible embodiment, the group identifier information of the at least one target search space set is identifier information obtained after renumbering, in an ascending order, specified identifiers in search space set groups obtained through grouping, the specified identifier being an identifier of a search space set with a minimum identifier in a corresponding search space set group, and alternatively, the specified identifier being an identifier of a search space set with a maximum identifier in a corresponding search space set group.

In a possible embodiment, the group identifier information of the at least one target search space set is identifier information obtained after renumbering beam direction identifiers correspond to search space set groups obtained through grouping.

Reference may be made to the steps in the examples shown in FIGS. 2 and 3 for steps to be executed by the processor as configured, and will not be repeated here.

The solution provided by the example of the disclosure is introduced above by mainly taking the communication device as an example. It can be understood that in order to achieve the above functions, the communication device includes corresponding hardware structures and/or software modules for executing the functions. The example of the disclosure may be implemented in hardware or a combination of hardware and computer software, in combination with modules and algorithm steps of instances of the example of the disclosure. Whether a certain function is executed by hardware or computer software-driven hardware depends on particular application and design constraints of the technical solution. Those skilled in the art can use different methods to implement the described functions for each particular application, but such implementation should not be considered to go beyond the scope of the technical solution of the example of the disclosure.

Figure 7:
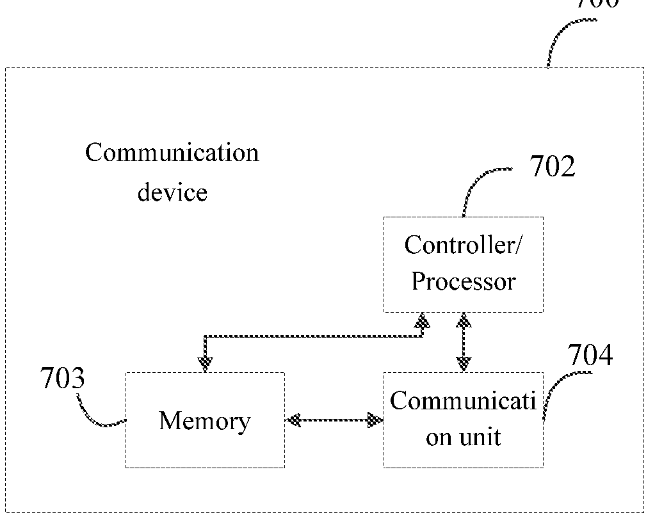
FIG. 7 is a schematic structural diagram of a communication device according to an example.

FIG. 7 is a schematic structural diagram of a communication device according to an example. The communication device may be implemented as the user device or the base station in the system environment shown in FIG. 1, and may perform all or some steps in the method described above or the example shown in FIG. 2 or FIG. 3.

The communication device 700 includes a communication unit 704 and a processor 702. The processor 702 may also be a controller, and is denoted as "controller/processor 702" in FIG. 7. The communication unit 704 is used to support the communication device to communicate with other network entities (such as other user devices or base stations).

Further, the communication device 700 may further include a memory 703, and the memory 703 is used for storing program codes and data of the communication device 700.

It may be understood that FIG. 7 merely shows simplified design of the communication device 700. In an actual application, the communication device 700 may include any number of processors, controllers, memories, communication units, etc., and all communication devices that may implement the example of the disclosure shall fall within the protection scope of the example of the disclosure.

Those skilled in the art should be aware of that in one or more instances above, functions described in the examples of the disclosure may be implemented by hardware, software, firmware or their any combination. When implemented in software, these functions may be stored in a computer-readable medium or transmitted as one or more instructions or codes on the computer-readable medium. The computer-readable medium includes a computer storage medium and a communication medium, and the communication medium includes any medium that facilitates transmission of computer programs from one place to another. The storage medium may be any available medium that may be accessed by a general-purpose or special-purpose computer.

The example of the disclosure further provides a non-transitory computer storage medium for storing computer software instructions used for the above communication device, which include programs designed for executing the methods shown in the above examples.

In an example, a computer program product or a computer program is further provided. The computer program product or the computer program includes a computer instruction stored in a computer-readable storage medium. A processor of a computer device reads the computer instruction from the computer-readable storage medium, and the processor executes the computer instruction, such that the computer device executes the method shown in the examples above.

According to a first aspect of examples of the disclosure, a method for determining a position of a control channel element is provided, and includes:

determining configuration information of at least one target search space set; and determining, according to the configuration information of the search space set and a hash function, a set of positions for PDCCH candidate CCE of the at least one target search space set; where the configuration information includes group identifier information of the at least one target search space set.

In a possible embodiment, the determining, according to the configuration information of the search space set and a hash function, a PDCCH candidate CCE position set of the search space set, includes:

obtaining the set of positions for PDCCH candidate CCE by inputting the group identifier information of the at least one target search space set into the hash function formula.

In a possible embodiment, in response to determining that the search space set includes at least two search space sets, a first set of positions for PDCCH candidate CCE corresponding to a first search space set and a second set of positions for PDCCH candidate CCE corresponding to a second search space set are distributed in a comb cross manner, the first search space set and the second search space set being any two among the at least two search space sets.

In a possible embodiment, the hash function formula includes a first hash function formula, the first hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where K represents the group identifier information of the at least one target search space set, and K equals an integer greater than or equal to 0.

In a possible embodiment, the hash function formula includes a second hash function formula, the second hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where $m_{s,n_{CI}}$ represents an enhanced PDCCH candidate identifier; and enhanced PDCCH candidate identifiers of respective PDCCH candidates of the at least two search space sets are determined by PDCCH candidate identifiers of the at least two search space sets.

In a possible embodiment, in response to determining that the search space set includes at least two search space sets, there is no overlap between a minimum continuous position interval corresponding to the first set of positions for PDCCH candidate CCE of the first search space set and a minimum continuous position interval corresponding to the second set of positions for PDCCH candidate CCE of the second search space set, the minimum continuous position interval being an interval from a first CCE position to a last CCE position in a corresponding set of positions for PDCCH candidate CCE, and the first search space set and the second search space set being any two among the at least two search space sets.

In a possible embodiment, the hash function formula includes a third hash function formula, the third hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where for a search space set with group identifier information of 0, $m_{s,n_{CI}}$ represents a PDCCH candidate identifier in the search space set with group identifier information of 0; and for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

In a possible embodiment, PDCCH candidate CCE of the at least two search space sets are in the same time slot, and the at least two search space sets correspond to the same control resource set.

In a possible embodiment, the at least two search space sets correspond to different beam direction identifiers.

In a possible embodiment, the group identifier information of the search space set is obtained according to a grouping result of grouping search space sets, search space sets in the same search space set group corresponding to the same beam direction identifier.

In a possible embodiment, the group identifier information of the at least one target search space set is identifier information obtained after renumbering, in an ascending order, specified identifiers in search space set groups obtained through grouping, the specified identifier being an identifier of a search space set with a minimum identifier in a corresponding search space set group, and alternatively, the specified identifier being an identifier of a search space set with a maximum identifier in a corresponding search space set group.

In a possible embodiment, the group identifier information of the at least one target search space set is identifier information obtained after renumbering beam direction identifiers corresponding to search space set groups obtained through grouping.

According to a second aspect of the examples of the disclosure, an apparatus for determining a position of a control channel element is provided. The apparatus includes:

a configuration information obtaining module configured to determine configuration information of at least one target search space set; and a position set determination module configured to determine, according to the configuration information of the at least one target search space set and a hash function, a set of positions for PDCCH candidate CCE of the at least one target search space set; where the configuration information includes group identifier information of the at least one target search space set.

In a possible embodiment, a position set determination module is configured to obtain the set of positions for PDCCH candidate CCE by inputting the group identifier information of the at least one target search space set into the hash function formula.

In a possible embodiment, in response to determining that the at least one target search space set includes at least two search space sets, a first set of positions for PDCCH candidate CCE corresponding to a first search space set and a second set of positions for PDCCH candidate CCE corresponding to a second search space set are distributed in a comb cross manner, the first search space set and the second search space set being any two among the at least two search space sets.

In a possible embodiment, the hash function formula includes a first hash function formula, the first hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where K represents the group identifier information of the at least one target search space set, and K equals an integer greater than or equal to 0.

In a possible embodiment, the hash function formula includes a second hash function formula, the second hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where $m_{s,n_{CI}}$ represents an enhanced PDCCH candidate identifier; and enhanced PDCCH candidate identifiers of respective PDCCH candidates of the at least two search space sets are determined by PDCCH candidate identifiers of the at least two search space sets.

In a possible embodiment, in response to determining that the at least one target search space set includes at least two search space sets, there is no overlap between a minimum continuous position interval corresponding to the first set of positions for PDCCH candidate CCE of the first search space set and a minimum continuous position interval corresponding to the second set of positions for PDCCH candidate CCE of the second search space set, the minimum continuous position interval being an interval from a first CCE position to a last CCE position in a corresponding set of positions for PDCCH candidate CCE, and the first search space set and the second search space set being any two among the at least two search space sets.

In a possible embodiment, the hash function formula includes a third hash function formula, the third hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

where for a search space set with group identifier information of 0, $m_{s,n_{CI}}$ represents a PDCCH candidate identifier in the search space set with group identifier information of 0; and for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

In a possible embodiment, PDCCH candidate CCE of the at least two search space sets are in the same time slot, and the at least two search space sets correspond to the same control resource set.

In a possible embodiment, the at least two search space sets correspond to different beam direction identifiers.

In a possible embodiment, the group identifier information of the at least one target search space set is obtained according to a grouping result of grouping search space sets, and, search space sets in the same search space set group correspond to the same beam direction identifier.

In a possible embodiment, the group identifier information of the at least one target search space set is identifier information obtained after renumbering, in an ascending order, specified identifiers in search space set groups obtained through grouping, the specified identifier being an identifier of a search space set with a minimum identifier in a corresponding search space set group, and alternatively, the specified identifier being an identifier of a search space set with a maximum identifier in a corresponding search space set group.

In a possible embodiment, the group identifier information of the at least one target search space set is identifier information obtained after renumbering beam direction identifiers corresponding to search space set groups obtained through grouping.

According to a third aspect of the examples of the disclosure, an apparatus for determining a position of a control channel element is provided. The apparatus includes:

a processor; and a memory configured to store an instruction executable by the processor;

where the processor is configured to: determine configuration information of a search space set; and determine, according to the configuration information of the at least one target search space set and a hash function, a set of positions for physical downlink control channel (PDCCH) candidate control channel element (CCE) of the at least one target search space set; where the configuration information includes group identifier information of the at least one target search space set.

According to a fourth aspect of the examples of the disclosure, a non-transitory computer-readable storage medium is provided. The non-transitory computer-readable storage medium includes an executable instruction, the executable instruction implementing the above method for determining a position of a control channel element when called up by a processor of a communication device.

According to a fifth aspect of the examples of the disclosure, a computer program product or a computer program is provided. The computer program product or the computer program includes a computer instruction stored in a computer-readable storage medium. A processor of a computer device reads the computer instruction from the computer-readable storage medium, and the processor executes the computer instruction, such that the computer device executes the method for determining a position of a control channel element.

The technical solution provided by the example of the disclosure may have the following beneficial effects:

when the set of positions for PDCCH candidate CCE of the at least one target search space set is computed, the configuration information of the at least one target search space set is introduced by combining the hash function, that is to say, the determined the set of positions for PDCCH candidate CCE of the at least one target search space set is related to the configuration information of the at least one target search space set, that is, the group identifier information of the at least one target search space set. For two or more search space sets with different group identifier information, even if the search space sets correspond to the same CORESET, at the same aggregation level, and in the same time slot, sets of positions for PDCCH candidate CCE may not overlap each other, thus satisfying the requirement of repeated transmission through a PDCCH under multi-transmission and reception points (Multi-TRP) of frequency-division multiplexing (FDM), and improving transmission reliability of the PDCCH.

Those skilled in the art could easily conceive of other implementation solutions of the disclosure upon consideration of the description and the invention disclosed here. The disclosure is intended to cover any modification, use or adaptive change of the disclosure, which follows general principles of the disclosure and includes common general knowledge or conventional technical means in the technical field not disclosed in the disclosure. The description and the examples are merely considered illustrative, and a true scope and spirit of the disclosure are indicated by the following claims.

It shall be understood that the disclosure is not limited to precise structures described above and shown in the accompanying drawings, and various modifications and changes can be made without departing from the scope of the disclosure. The scope of the disclosure is merely limited by the appended claims.

What is claimed is:

1. A method for determining a position of a control channel element, comprising:

determining configuration information of at least one target search space set; and determining, according to the configuration information of the at least one target search space set and a hash function, a set of positions for physical downlink control channel (PDCCH) candidate control channel element (CCE) of the at least one target search space set; wherein the configuration information comprises group identifier information of the at least one target search space set;

wherein determining, according to the configuration information of the at least one target search space set and the hash function, the set of positions for PDCCH candidate CCE of the at least one target search space set, comprises:

obtaining, by inputting the group identifier information of the at least one target search space set into a formula of the hash function, the set of positions for PDCCH candidate CCE;

wherein in response to determining that the at least one target search space set comprises at least two search space sets, a first set of positions for PDCCH candidate CCE corresponding to a first search space set and a second set of positions for PDCCH candidate CCE corresponding to a second search space set are distributed in a comb cross manner, wherein the first search space set and the second search space set are any two among the at least two search space sets;

or, in response to determining that the at least one target search space set comprises a first search space set and a second search space set, there is no overlap between a minimum continuous position interval corresponding to the first set of positions for PDCCH candidate CCE of the first search space set and a minimum continuous position interval corresponding to the second set of positions for PDCCH candidate CCE of the second search space set, wherein the minimum continuous position interval is an interval from a first CCE position to a last CCE position in a corresponding set of positions for PDCCH candidate CCE, and the first search space set and the second search space set are any two among the at least two search space sets.

2. The method according to claim 1, wherein the hash function formula comprises a first hash function formula, the first hash function formula being expressed as follows:

$$L\cdot\left\{Y_{p,n^u_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\left\lfloor N_{CCE,p}/L\right\rfloor+i;$$

wherein K represents the group identifier information of the at least one target search space set, and K equals an integer greater than or equal to 0, L represents an aggregation level, $$Y_{p,n^u_{s,f}}$$

represents an initial value, $$M^{(L)}_{s,max}$$

represents the maximum number of PDCCH candidates at the aggregation level, $m_{s,n_{CI}}$ represents the number of PDCCH candidates configured for a terminal, $N_{CCE,p}$ represents the number of CCEs included in a control resource set, and $n_{CI}$ represents a carrier parameter, $i\in[0, L-1]$.

3. The method according to claim 1, wherein the hash function formula comprises a second hash function formula, the second hash function formula being expressed as follows:

$$L\cdot\left\{Y_{p,n^u_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\left\lfloor N_{CCE,p}/L\right\rfloor+i;$$

wherein $m_{s,n_{CI}}$ represents an enhanced PDCCH candidate identifier, L represents an aggregation level, $$Y_{p,n^u_{s,f}}$$

represents an initial value, $$M^{(L)}_{s,max}$$

represents the maximum number of PDCCH candidates at the aggregation level, $N_{CCE,p}$ represents the number of CCEs included in a control resource set, and $n_{CI}$ represents a carrier parameter, i∈[0, L-1]; and enhanced PDCCH candidate identifiers of respective PDCCH candidates of the at least two search space sets are determined by PDCCH candidate identifiers of the at least two search space sets.

4. The method according to claim 1, wherein the hash function formula comprises a third hash function formula, the third hash function formula being expressed as follows:

$$L\cdot\left\{Y_{p,n^u_{s,f}}+\left\lfloor\frac{m_{s,n_{CI}}\cdot N_{CCE,p}}{L\cdot M^{(L)}_{s,max}}\right\rfloor+n_{CI}+K\right\}\mathrm{mod}\left\lfloor N_{CCE,p}/L\right\rfloor+i;$$

wherein L represents an aggregation level $$Y_{p,n^u_{s,f}}$$

represents an initial value, $$M^{(L)}_{s,max}$$

represents the maximum number of PDCCH candidates at the aggregation level, $N_{CCE,p}$ represents the number of CCEs included in a control resource set, and $n_{CI}$ represents a carrier parameter, i∈[0, L-1];

for a search space set with group identifier information of 0, $m_{s,n_{CI}}$ represents a PDCCH candidate identifier in the search space set with group identifier information of 0; and for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

5. The method according to claim 1, wherein

PDCCH candidate CCE of the at least two search space sets are in the same time slot, and the at least two search space sets correspond to the same control resource set.

6. The method according to claim 5, wherein the at least two search space sets correspond to different beam direction identifiers.

7. The method according to claim 1, wherein the group identifier information of the at least one target search space set is obtained according to a grouping result of grouping search space sets, and for search space sets in any one of search space set groups, beam direction identifiers corresponding to the search space sets are the same.

8. The method according to claim 7, wherein the group identifier information of the at least one target search space set is identifier information obtained after renumbering, in an ascending order, specified identifiers in search space set groups obtained through grouping, the specified identifier being an identifier of a search space set with a minimum identifier in a corresponding search space set group, and alternatively, the specified identifier being an identifier of a search space set with a maximum identifier in a corresponding search space set group.

9. The method according to claim 7, wherein the group identifier information of the at least one target search space set is identifier information obtained after renumbering beam direction identifiers corresponding to search space set groups obtained through grouping.

10. An apparatus for determining a position of a control channel element, comprising:

a processor, and a memory configured to store an instruction executable by the processor, the processor is configured to:

determine configuration information of at least one target search space set; and determine, according to the configuration information of the at least one target search space set and a hash function, a set of positions for physical downlink control channel (PDCCH) candidate control channel element (CCE) of the at least one target search space set; wherein the configuration information comprises group identifier information of the at least one target search space set;

wherein the processor is further configured to determine the set of positions for PDCCH candidate CCE of the at least one target search space set by obtaining, by inputting the group identifier information of the at least one target search space set into the hash function formula, the set of positions for PDCCH candidate CCE;

wherein in response to determining that the at least one target search space set comprises at least two search space sets, a first set of positions for PDCCH candidate CCE corresponding to a first search space set and a second set of positions for PDCCH candidate CCE corresponding to a second search space set are distributed in a comb cross manner, wherein the first search space set and the second search space set are any two among the at least two search space sets;

or, in response to determining that the at least one target search space set comprises a first search space set and a second search space set, there is no overlap between a minimum continuous position interval corresponding to the first set of positions for PDCCH candidate CCE of the first search space set and a minimum continuous position interval corresponding to the second set of positions for PDCCH candidate CCE of the second search space set, wherein the minimum continuous position interval is an interval from a first CCE position to a last CCE position in a corresponding set of positions for PDCCH candidate CCE, and the first search space set and the second search space set are any two among the at least two search space sets.

11. The apparatus according to claim 10, wherein the hash function formula comprises a first hash function formula, the first hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

wherein K represents the group identifier information of the target search space set, and K equals an integer greater than or equal to 0, L represents an aggregation level, $$Y_{p,n^{u}_{s,f}}$$

represents an initial value, $$M^{(L)}_{s,max}$$

represents the maximum number of PDCCH candidates at the aggregation level, $m_{s,n_{CI}}$ represents the number of PDCCH candidates configured for a terminal, $N_{CCE,p}$ represents the number of CCEs included in a control resource set, and $n_{CI}$ represents a carrier parameter, $i\in[0, L-1]$.

12. The apparatus according to claim 10, wherein the hash function formula comprises a second hash function formula, the second hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

wherein $m_{s,n_{CI}}$ represents an enhanced PDCCH candidate identifier, L represents an aggregation level, $$Y_{p,n^{u}_{s,f}}$$

represents an initial value, $$M^{(L)}_{s,max}$$

represents the maximum number of PDCCH candidates at the aggregation level, $N_{CCE,p}$ represents the number of CCEs included in a control resource set, and $n_{CI}$ represents a carrier parameter, $i\in[0, L-1]$; and enhanced PDCCH candidate identifiers of respective PDCCH candidates of the at least two search space sets are determined by PDCCH candidate identifiers of the at least two search space sets.

13. The apparatus according to claim 10, wherein the hash function formula comprises a third hash function formula, the third hash function formula being expressed as follows:

$$L\cdot\left\{Y_{p,n^{u}_{s,f}}+\left\lfloor\frac{m_{s,n_{CI}}\cdot N_{CCE,p}}{L\cdot M^{(L)}_{s,max}}\right\rfloor+n_{CI}+K\right\}\bmod\lfloor N_{CCE,p}/L\rfloor+i;$$

wherein L represents an aggregation level, $$Y_{p,n^{u}_{s,f}}$$

represents an initial value, $$M^{(L)}_{s,max}$$

represents the maximum number of PDCCH candidates at the aggregation level, $N_{CCE,p}$ represents the number of CCEs included in a control resource set, and $n_{CI}$ represents a carrier parameter, $i\in[0, L-1]$;

for a search space set with group identifier information of 0, $m_{s,n_{CI}}$ represents a PDCCH candidate identifier in the search space set with group identifier information of 0; and for a search space set with group identifier information of j, j equals an integer greater than 0, and $m_{s,n_{CI}}$ equals the total number of PDCCH candidates in a search space set with group identifier information less than j plus a PDCCH candidate identifier in the search space set with group identifier information of j.

14. A non-transitory computer-readable storage medium, comprising an executable instruction, wherein a processor is configured to execute the executable instructions to:

determine configuration information of at least one target search space set; and determine, according to the configuration information of the at least one target search space set and a hash function, a set of positions for physical downlink control channel (PDCCH) candidate control channel element (CCE) of the at least one target search space set; wherein the configuration information comprises group identifier information of the at least one target search space set;

wherein the processor is further configured to execute the executable instructions to determine the set of positions for PDCCH candidate CCE of the at least one target search space set by obtaining, by inputting the group identifier information of the at least one target search space set into a formula of the hash function, the set of positions for PDCCH candidate CCE;

wherein in response to determining that the at least one target search space set comprises at least two search space sets, a first set of positions for PDCCH candidate CCE corresponding to a first search space set and a second set of positions for PDCCH candidate CCE corresponding to a second search space set are distributed in a comb cross manner, wherein the first search space set and the second search space set are any two among the at least two search space sets;

or, in response to determining that the at least one target search space set comprises a first search space set and a second search space set, there is no overlap between a minimum continuous position interval corresponding to the first set of positions for PDCCH candidate CCE of the first search space set and a minimum continuous position interval corresponding to the second set of positions for PDCCH candidate CCE of the second search space set, wherein the minimum continuous position interval is an interval from a first CCE position to a last CCE position in a corresponding set of positions for PDCCH candidate CCE, and the first search space set and the second search space set are any two among the at least two search space sets.

* * * * *